(12) United States Patent
Pannell (10) Patent No.: US 12,185,648 B2
(45) Date of Patent: Jan. 7, 2025

(54) EARTH CONDITIONING APPARATUS, SYSTEMS AND METHODS

(71) Applicant: ROCKS GONE PTY LTD, Welshpool (AU)

(72) Inventor: Timothy Gordon Pannell, Welshpool (AU)

(73) Assignee: ROCKS GONE PTY LTD, Welshpool (AU)

( * ) Notice: Subject to any disclaimer, the term of this patent is extended or adjusted under 35 U.S.C. 154(b) by 673 days.

(21) Appl. No.: 16/972,991

(22) PCT Filed: Jun. 6, 2019

(86) PCT No.: PCT/AU2019/050584
§ 371 (c)(1),
(2) Date: Dec. 7, 2020

(87) PCT Pub. No.: WO2019/232586
PCT Pub. Date: Dec. 12, 2019

(65) Prior Publication Data
US 2021/0251126 A1    Aug. 19, 2021

(30) Foreign Application Priority Data

Jun. 7, 2018   (AU) ................................ 2018902062

(51) Int. Cl.
*A01B 5/04*        (2006.01)
*A01B 13/08*       (2006.01)
(Continued)

(52) U.S. Cl.
CPC ............... *A01B 5/04* (2013.01); *A01B 13/08* (2013.01); *A01B 17/004* (2013.01); *A01B 27/005* (2013.01); *A01B 63/32* (2013.01)

(58) Field of Classification Search
CPC ..... A01B 27/005; A01B 17/004; A01B 13/08; A01B 49/027; A01B 61/042; A01B 61/044; A01B 63/32; A01B 63/24
See application file for complete search history.

(56) References Cited

U.S. PATENT DOCUMENTS 3,503,456 A * 3/1970 Larson ................... A01B 13/08
                                                 172/699
3,831,684 A * 8/1974 Thigpen ................... E02F 5/32
                                                 172/699

(Continued)

FOREIGN PATENT DOCUMENTS

| AU | 2014203634 A1 * | 1/2016 |
| AU | 2014203634 B2 | 1/2016 |
| CN | 107256043 A | 10/2017 |

OTHER PUBLICATIONS

Office action for related matter EP19815408.0 dated Jul. 18, 2023.

*Primary Examiner* — Adam J Behrens
*Assistant Examiner* — Blake E Scoville
(74) *Attorney, Agent, or Firm* — Vorys, Sater, Seymour and Pease LLP (57) ABSTRACT

Provided is an earth conditioning system/apparatus which removes/break-ups rock in the ground and has a front drawbar, a ground engaging tool arrangement and a rear rotary device (drum). A ground engaging tool arrangement includes a frame supporting ground engaging tools each mounted at a pivot. Actuators raise/lower the ground engaging tool(s) for desired depth control of the ground engaging tools. The rotary device slotted or ribbed drum acts as a crushing drum rolled over earth that has been broken up by the ground engaging tools. Actuators, provide height adjustment of the ground engaging tools relative to the ground engaging tool support frame and by adjusting the height from the ground of the ground engaging tool arrangement by (Continued)

operating the at least one adjuster acting between the rotary device and the ground engaging tool arrangement.

28 Claims, 6 Drawing Sheets

(51) Int. Cl.
*A01B 17/00* (2006.01)
*A01B 27/00* (2006.01)
*A01B 63/32* (2006.01)

(56) References Cited

U.S. PATENT DOCUMENTS

| | | | | |
|---|---|---|---|---|
| 3,937,460 | A * | 2/1976 | van der Lely | A01B 49/025 |
| | | | | 172/70 |
| 4,280,564 | A * | 7/1981 | van der Lely | A01B 29/048 |
| | | | | 172/151 |
| 4,815,545 | A * | 3/1989 | Symonds | A01B 13/08 |
| | | | | 172/699 |
| 4,865,132 | A * | 9/1989 | Moore, Jr. | A01B 63/32 |
| | | | | 172/488 |
| 4,991,659 | A * | 2/1991 | Stepe | E02F 5/32 |
| | | | | 172/699 |
| 5,265,975 | A * | 11/1993 | Scott | E01C 23/082 |
| | | | | 172/197 |
| 5,797,460 | A * | 8/1998 | Parker | A01B 49/027 |
| | | | | 172/603 |
| 2012/0118593 | A1 * | 5/2012 | Hall | E02F 5/326 |
| | | | | 172/40 |

\* cited by examiner

Fig 1
(AMENDED)

Fig 2
(AMENDED)

Fig 3
(AMENDED)

Fig 4
(AMENDED)

Fig 5
(AMENDED)

Fig 6
(AMENDED)

Fig 7
(AMENDED)

EARTH CONDITIONING APPARATUS, SYSTEMS AND METHODS

FIELD OF THE INVENTION

The present invention relates to apparatus, systems and methods for conditioning earth.

One or more forms of the present invention provides an apparatus, system and/or method that advantageously processes earth to crush and/or scarify rock.

BACKGROUND TO THE INVENTION

It is desirable to improve soil conditions in different applications. Rock crushing is sometimes performed for this purpose. Where cap rock is present at or immediately below soil surface, scarifying can remove rock in one, or more usually, several passes by scarifying equipment.

The reliability, ease and speed of rock crushing and/or scarifying are often considerations, particularly for economic and/or deadline factors.

Rotary type rock grinders are slow and expensive to purchase and operate.

An alternative piece of equipment for crushing/removing rock, as described in Australian patent application published as AU 2014203634, does not cope well with certain rock and soil mix conditions, wet working conditions, residue and surface vegetation, and viable crushing depth.

A ripper is an alternative piece of equipment for breaking up or lifting rock to the surface. The ripper can be used with conventional machines (such as attached to the rear of a tractor) and uses teeth that engage into the ground to break up or drag rock to the surface for removal. The teeth leave the rock ripped up in large regular pieces or dragged up whole to the surface and need further processing or removal.

Rotary type machines have also been used in the past. These are inherently expensive to operate and maintain, and productivity is relatively low. Use of such rotary machines can make the land difficult to develop without the added costs of clean up and repair to the site.

It is against this background and the problems and difficulties associated therewith that the present invention has been developed.

It will be appreciated that one or more forms of the present invention advantageously provides the capability to crush rock and soils with surface vegetation and residues in situ.

Soft, sandy and rocky areas with any soils mixed with the rock can make other devices hard to tow, whereas one or more forms of the present invention alleviate such drawbacks.

SUMMARY OF THE INVENTION

An aspect of the present invention provides an earth conditioning system including a ground engaging tool arrangement including a ground engaging tool support structure supporting at least one ground engaging tool for being urged below a ground surface into the ground to engage with rock within the ground, the at least one ground engaging tool mounted to the ground engaging tool support structure for adjustment of height or depth engagement with the ground, the adjustment provided by at least one actuator.

The ground engaging tool arrangement may be attached to a prime mover, such as a tractor. The ground engaging tool arrangement may be powered.

The ground engaging tool arrangement may be combined with a rotary device.

For example, one or more forms of the present invention may provide an earth conditioning system including the ground engaging tool arrangement including a ground engaging tool support structure supporting at least one ground engaging tool for being urged below a ground surface into the ground to engage with rock within the ground, and a rotary device trailing the ground engaging tool arrangement.

Preferably the rotary device may provide a drum or roller having external ribs thereon.

Alternatively or in addition, the drum or roller may have a series of wall structures defining a number of edges and channels therebetween.

The drum or roller may provide the ribs or edges for further breaking and also flattening/levelling the earth.

It will be appreciated that the present invention is applicable to one or more of farming/agriculture where shallow rock is present, road building with existing rock, road maintenance, site development e.g. mine sites, mine haul roads, building sites, infrastructure builds, such as bridges, railways, airports etc.

One or more of adjustability, mass and balance enable one or more embodiments of the present invention to work effectively in a wide range of rock and soil mixes and reduces the energy required to pull or move the earth conditioning system compared with one or more known devices.

It will be appreciated that one or more forms of the present invention can be controlled to accommodate a variety of working conditions, such as wet ground. One or more forms of the present invention will work in a wide range of environments and variable conditions i.e. wet and/or dry ground conditions.

One or more embodiments of the present invention can crush, mix and level to a depth in excess of 400 mm. At least one other known system could only crush effectively to approximately 180 mm.

Preferably, the ground engaging tool arrangement includes a ground engaging tool adjustment system to adjust height of the at least one ground engaging tool relative to the ground. For example, the depth that the at least one ground engaging tool engages into the ground may be adjusted, such as to allow for harder/rockier ground where engaging too deep might put too much strain on the tine(s) or overload a part of the ground engaging tool arrangement.

Preferably, height adjustment (and therefore depth into the ground or lifting away from the ground) of the at least one ground engaging tool may be provided by at least one actuator, such as one or more hydraulic rams, one or more pneumatic rams, one or more electric actuators (such as one or more motors) or one or more mechanical actuators, such as springs, or a combination of any two or more thereof.

Preferably each said ground engaging tool or pairs of ground engaging tools may be height adjusted by the at least one actuator.

The ground engaging tool support structure may include at least one ground engaging tool frame to which the at least one ground engaging tool is attached, such as pivotably attached. The at least one actuator may be mounted to the ground engaging tool frame.

The at least one ground engaging tool may be pivotably mounted at or adjacent a leading end of the respective ground engaging tool. For example, a ground engaging tool body portion may trail behind the pivotably leading end of the respective ground engaging tool.

Preferably height adjustment of the respective ground engaging tool is provided by the respective actuator raising or lowering (as required) a trailing end of the respective ground engaging tool with the respective ground engaging tool pivoting about the leading end thereof.

It will be appreciated that the term 'ground engaging tool' encompasses having one or more tines, spikes or tooth/teeth or blade devices, which may include a replaceable wear part as a removable tooth, spike, blade or tine.

The at least one ground engaging tool may include a body to which a removable tool is attached as a replaceable wear part, which avoids the need to replace the entire ground engaging tool body and also simplifies the tool replacement process.

A quick release mechanism may be provided to enable relatively rapid removal and replacement of the worn/broken tool with a fresh tool.

Preferably the wall structures or a body of the drum of the rotary device may rotate about a pivot axis.

More preferably, the wall structures or the drum body may be mounted to a rotary device support structure, which may be connected to the ground engaging tool support structure by a first connection pivot.

The first connection pivot may allow the rotary device and the ground engaging tool arrangement to pivot relative to one another during use over uneven ground and then allow the ground engaging tool arrangement to raise relative to the rotary device.

The rotary device may provide a trailing rotary bladed roller support of the earth conditioning system.

The ground engaging tool arrangement may be pivotably connected to a towing device, such as a drawbar arrangement or hitch arrangement.

Preferably the drawbar or hitch arrangement includes a towing hitch for connection to a vehicle to tow the earth conditioning system.

It will be appreciated that an earth conditioning system embodying the present invention can work to level the ground surface as it passes there-over.

Preferably, the earth conditioning system may be a towed apparatus, such as by towing behind a tractor, digger or other prime mover vehicle.

The earth conditioning system can hold rock down as it cuts through with ground engaging tools.

It will be appreciated that the earth conditioning system embodying the present invention can provide a large amount of weight over the ground engaging tools and/or the rotary device in a carefully balanced manner to give the earth conditioning system the best ability to cut through rock using its mass and balance.

The mass of the earth conditioning system can absorb shock from the impact of the rocks on the ground engaging tools and/or rotary device. The mass also gives it kinetic energy when passing through areas of harder/tougher/stronger rock, such as granite and sandstone.

Preferably the earth conditioning system can operate at speeds of around 10 km/hr over the ground, and may preferably be a multi-pass machine.

The at least one ground engaging tool can be mounted to the ground engaging tool frame and may preferably have a release mechanism which allows the respective ground engaging tool to relieve out of work position if it strikes very hard rock or debris e.g. granite.

The release mechanism may be actuated hydraulically, pneumatically, electrically, or mechanically.

Mechanical relief may be provided by at least one shear pin and/or biasing means, a spring or dampener or accumulator (such as a hydraulic or pneumatic accumulator).

Pneumatic, hydraulic and/or electric actuation of the relief arrangement may be passively or actively controlled, such as by sensing shock and/or pressure on the ground engaging tool(s) and lifting and/or lowering the ground engaging tools as required to manage load thereon.

The at least one ground engaging tool may preferably be shaped, spaced and combined to allow the flow of rock soil and general debris to pass thereby and be crushed by the rotary device.

Preferably the ground engaging tool arrangement provides a grate and the rotary device may include a ribbed roller.

Preferably the rotary device provides rear depth control, such as for depth of engagement of the ground engaging tool(s).

Preferably the rotary device provides a secondary rock crushing application.

It will be appreciated that the rotary device may include spaced ribs, and preferably having a rib cleaning bar with individual teeth that clean debris, soil, and rock, from between the ribs during rotation. The ribs may be of or include wear plate material, such as hardened steel, bisalloy or alternatives.

The earth conditioning system may include a drawbar to give the prime mover sufficient leverage over it for effective control and isolation.

The drawbar may include at least one horizontal shock dampener and/or at least one vertical shock dampener.

One or more said dampeners may be provided to prevent shock transmitting to the prime mover.

Preferably the rotary device includes a crushing drum for being rolled over earth that has passed through the ground engaging tool arrangement, the crushing drum having a number of projections for crushing the earth.

Preferably the ground engaging tool arrangement includes a pivot mechanism operable to allow the wall structures to be moved towards and away from the ground for earth conditioning and transport purposes, respectively.

Preferably the system includes a crushing drum and a hitch portion both pivotally connected to the ground engaging tool arrangement to facilitate the ground engaging tools to be lifted and lowered; the ground engaging tools being able to be positioned to engage into the ground a desired depth, such as a maximum depth, by adjusting the rotary device pivot mechanism or the ground engaging tool adjuster, or both, particularly when the hitch element is fixed at a desired height.

A further aspect of the present invention provides for use of an earth conditioning system including providing a ground engaging tool arrangement including a ground engaging tool support structure supporting at least one ground engaging tool for being urged below a ground surface into the ground to engage with rock within the ground, the at least one ground engaging tool mounted to the ground engaging tool support structure for adjustment of height or depth engagement with the ground, the adjustment provided by at least one actuator.

The method may include the ground engaging system with a prime mover, such as a tractor, to, in use, tow the ground engaging tool arrangement.

The method may include providing the ground engaging tool arrangement in combination with a rotary device. The rotary device may be provided as a roller or drum acting behind the ground engaging tool arrangement. The roller or drum may further condition the earth after the at least one ground engaging tool has scarified or gouged rocks in the earth to aid breaking them down or has ripped rocks from the earth or broken rocks in the earth or broken rocks brought to the surface.

One or more ribs or edges provided around the drum or roller may further condition earth (such as flattening or further breaking down rocks and soil) as the earth conditioning system progresses over the ground/surface.

The method may include crushing, mixing and/or levelling the earth/rocks to a depth in excess of 400 mm.

One or more embodiments of the present invention may include adjusting height of the at least one ground engaging tool relative to the ground. For example, the depth that the at least one ground engaging tool engages into the ground may be adjusted, such as to allow for harder/rockier ground where engaging too deep might put too much strain on the tine(s) or overload a part of the ground engaging tool arrangement.

Preferably, adjusting the height (and therefore depth into the ground or lifting away from the ground) of the at least one ground engaging tool may be provided by at least one actuator, such as one or more hydraulic rams, one or more pneumatic rams, one or more electric actuators (such as one or more motors) or one or more mechanical actuators, such as springs, or a combination of any two or more thereof.

Preferably the method may include adjusting the height of each said ground engaging tool or pairs of ground engaging tools by use of the at least one actuator. Each tool may be adjusted by a dedicated actuator. Preferably actuation is controlled from a controller provided on the support structure or on the prime mover or shared between both.

The at least one ground engaging tool may pivot, such as about a pivot axis. For example, the at least one ground engaging tool may be arranged to pivot rearwards or forwards as required with respect to a forward direction of motion during use of the system when the respective ground engaging tool is required to raise up (such as for height adjustment or non-engagement with the ground-such as for transport). Such pivoting may be damped, such as by a dampener or other shock absorber, which may include a hydraulic dampener or pneumatic dampener.

The ground engaging tool arrangement may adjust in height relative to the drum during use over uneven ground. For example, actuation of at least one adjuster may be used to raise the ground engaging tool arrangement relative to the rotary device. The rotary device and the ground engaging tool arrangement may pivot about a shared pivot axis such that a portion of each of the rotary device and the ground engaging tool arrangement moves closer to one another.

The ground engaging tool arrangement may be pivoted at a pivot connection relative to a towing device, such as a drawbar arrangement or hitch arrangement. Preferably the drawbar or hitch arrangement includes a towing hitch for connection to a vehicle to tow the earth conditioning system. A dampener may be provided to dampen that pivoting action.

The method can include propelling the ground engaging tool arrangement across an area of ground, adjusting height of the at least one ground engaging tool relative to the ground by adjusting one or both of a position of the at least one ground engaging tool relative to the support structure and varying the height of the ground engaging tool arrangement relative to the rotary device.

It will be appreciated that adjustment of the earth conditioning system embodying the present invention can control centre of mass/gravity of the system and thereby help to control/position weight applied through the ground engaging tools and/or the rotary device in a carefully balanced manner to give the earth conditioning system the best ability to cut through rock using its mass and balance.

The method may include operating a release mechanism which allows the respective ground engaging tool to relieve out of work position if a strike on very hard rock or large rock or debris e.g. very hard granite occurs. The release mechanism may be actuated hydraulically, pneumatically, electrically, or mechanically.

Mechanical relief may be provided by at least one shear pin and/or biasing means, a spring or dampener or accumulator (such as a hydraulic or pneumatic accumulator).

Pneumatic, hydraulic and/or electric actuation of the relief arrangement may be passively or actively controlled, such as by sensing shock and/or pressure on the ground engaging tool(s) and lifting and/or lowering the ground engaging tools as required to manage load thereon.

The method may include allowing a rock, soil and general debris to pass through the at least one ground engaging tool arrangement and be crushed/conditioned by the rotary device.

Preferably the rock and/or soil is allowed to pass through a grate to be crushed/flattened by the roller/drum.

Position of the roller or drum of the rotary device relative to the at least one ground engaging tool can be used to provide rear depth control, such as for depth of engagement of the ground engaging tool(s). Preferably the rotary device provides a secondary rock crushing application.

As will be discussed herein, embodiments of the present invention are considered to provide a number of preferred arrangements and benefits including:

(i) Earth conditioning systems and methods that are able to advantageously condition ground/earth containing igneous, metamorphic and/or sedimentary rock, or any combination thereof.

For example, hard, medium or rock rock(s), or any combination(s) thereof, such as, but not limited to, including magnetite, hematite, quartz, basalt, dolerite and other rocks considered to be hard rock, sandstones, laterites and limestone.

It will be appreciated that one or more embodiments of the present invention can process hard, medium and soft rocks, and if an exceptionally hard rock is encountered, the earth conditioning apparatus can pass without damage, such as due to the release mechanism which allows the respective ground engaging tool to relieve out of work position if a strike on very hard rock or large rock or debris e.g. a very hard granite occurs, and it therefore does not interfere with the operation and those exceptionally hard rocks can be dealt with later.

(ii) Earth conditioning systems and methods that act to separate the earth by forcing the earth through channels.

(iii) Earth conditioning systems and methods that excavate earth and lift before exiting a number of channels to assist with subsequent crushing using a heavy roller.

(iv) Earth conditioning systems and methods that are considered to be relatively reliable and maintainable.

It is to be recognised that other aspects, preferred forms and advantages of the present invention will be apparent from the present specification including the detailed description, drawings and claims.

BRIEF DESCRIPTION OF THE DRAWINGS

In order to facilitate a better understanding of the present invention, several preferred embodiments will now be described with reference to the accompanying drawings, in which.

DESCRIPTION OF PREFERRED EMBODIMENT

It is to be appreciated that each of the embodiments is specifically described and that the present invention is not to be construed as being limited to any specific feature or element of any one of the embodiments. Neither is the present invention to be construed as being limited to any feature of a number of the embodiments or variations described in relation to the embodiments.

Figure 1:
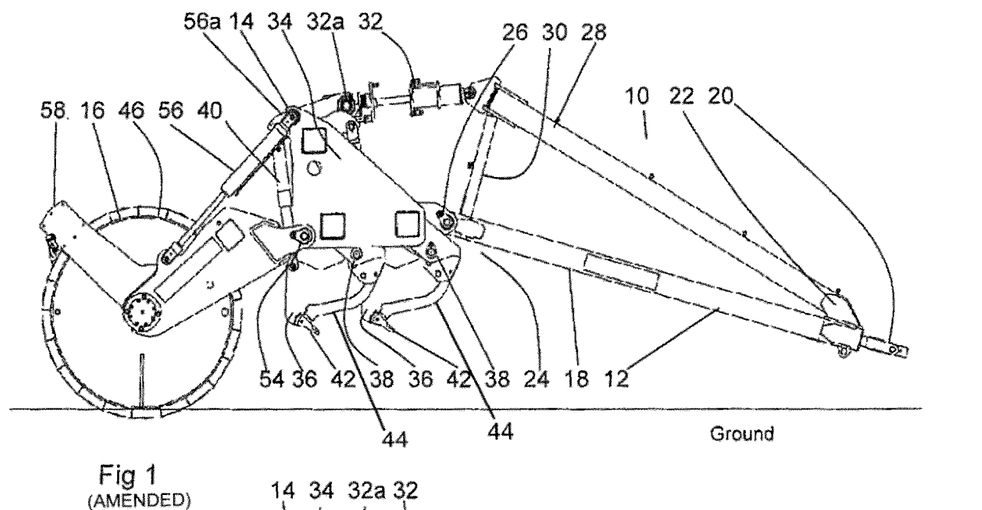
FIGS. 1 to 4 provides progressive side views of operation of the earth conditioning system embodying the present invention.
Figure 2:
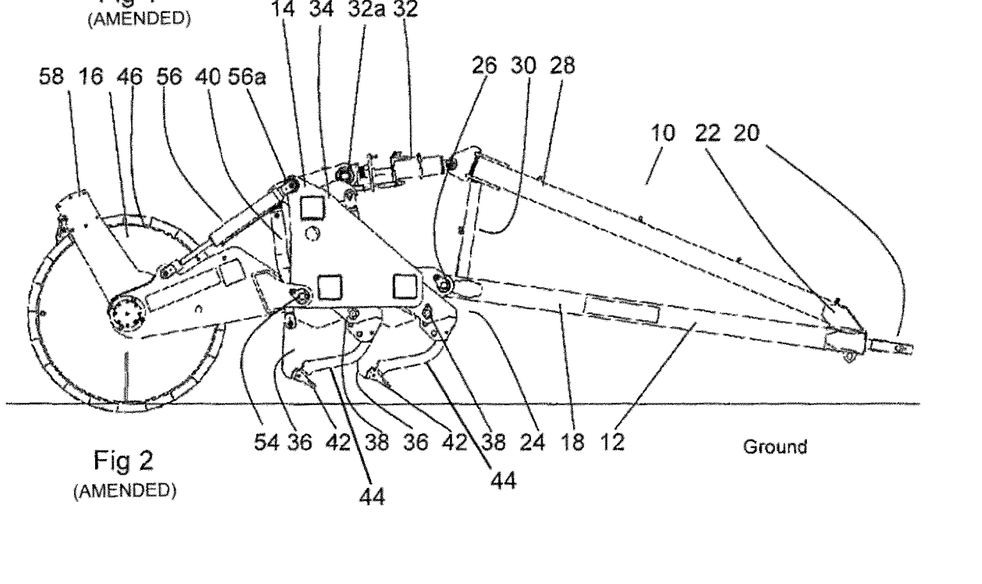
Figure 3:
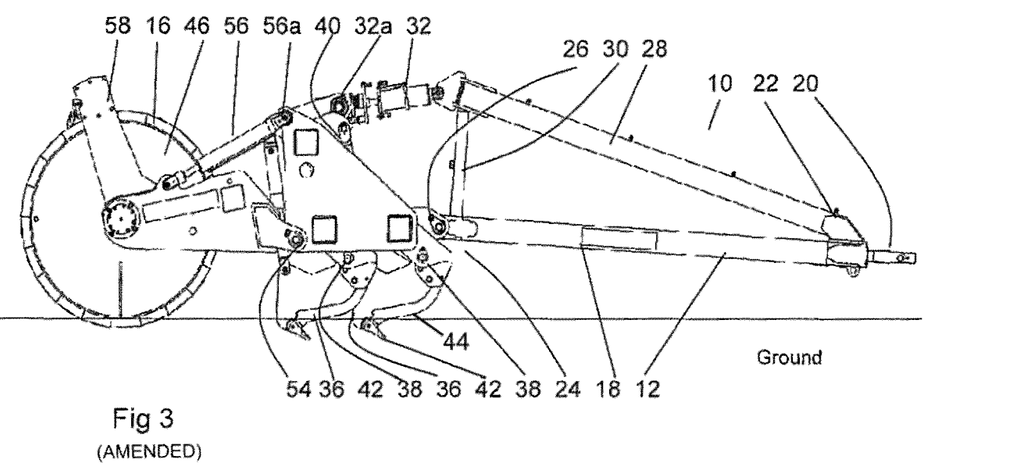
Figure 4:
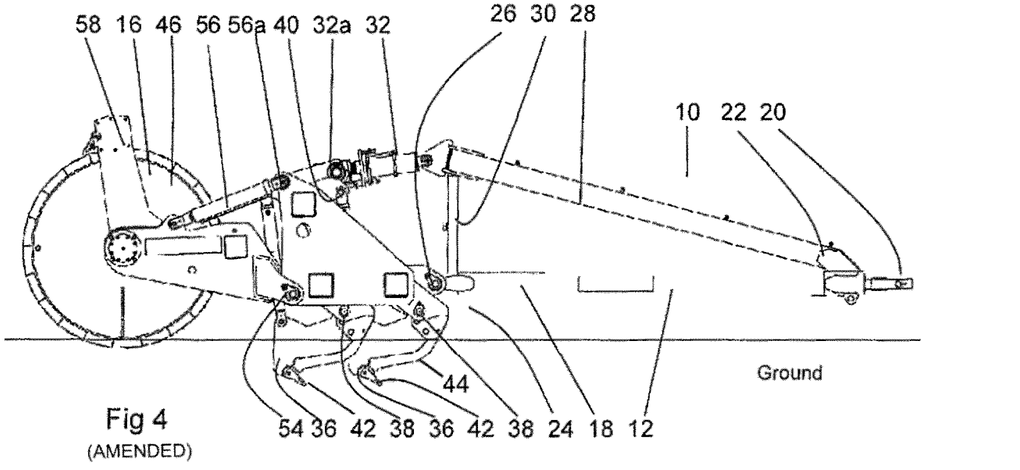
Figure 5:
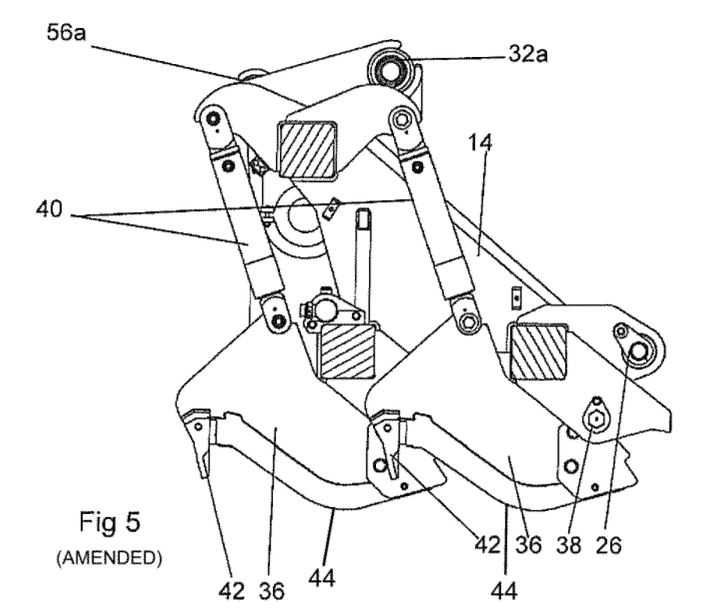
FIGS. 5 to 6 show views of the ground engaging tool arrangement with the ground engaging tools retracted (relieved) (FIG. 5) and deployed (FIG. 6) according to an embodiment of the present invention.
Figure 6:
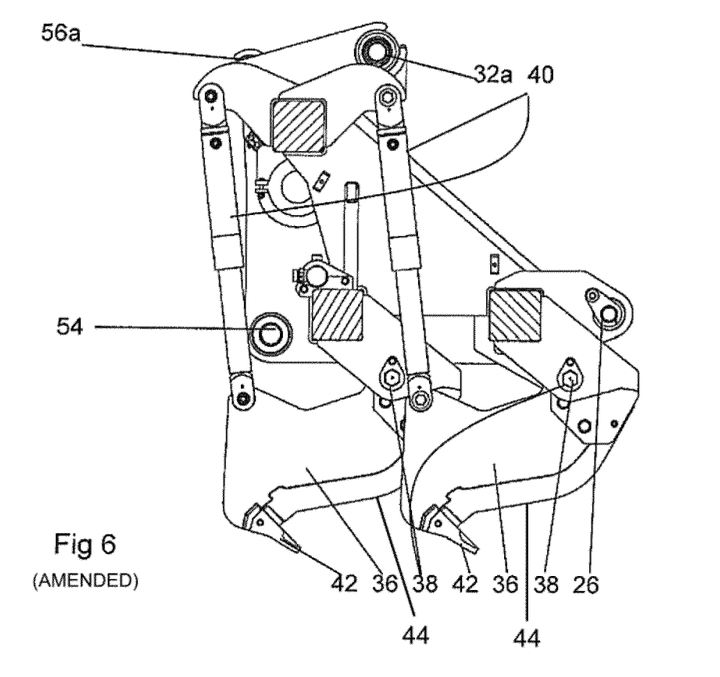
Figure 7:
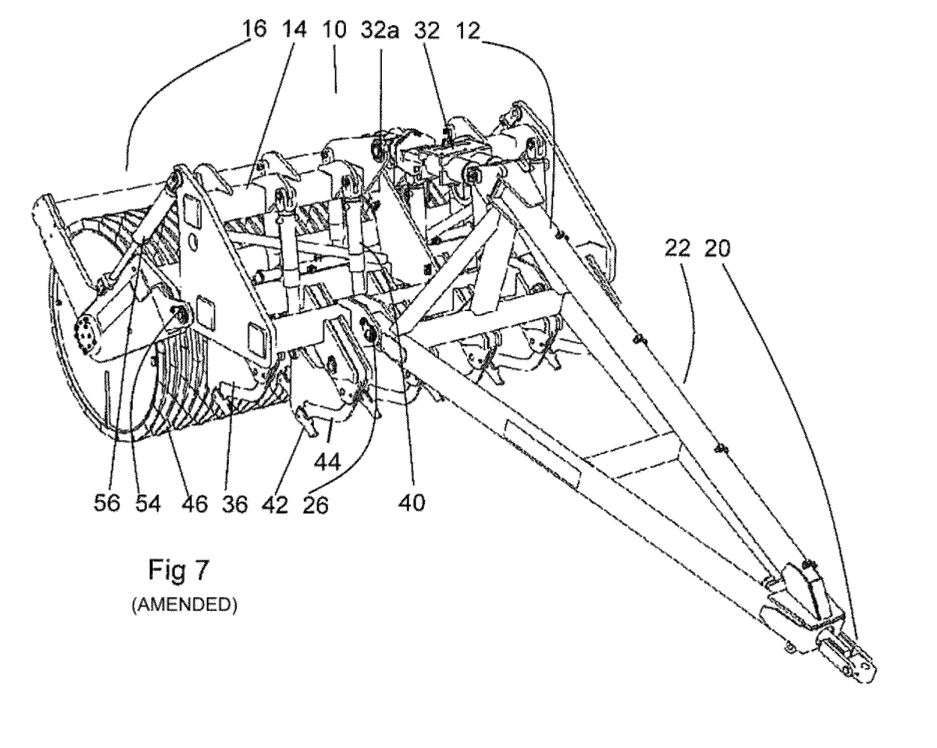
FIG. 7 shows a perspective view of an earth conditioning system according to an embodiment of the present invention.
Figure 8A:
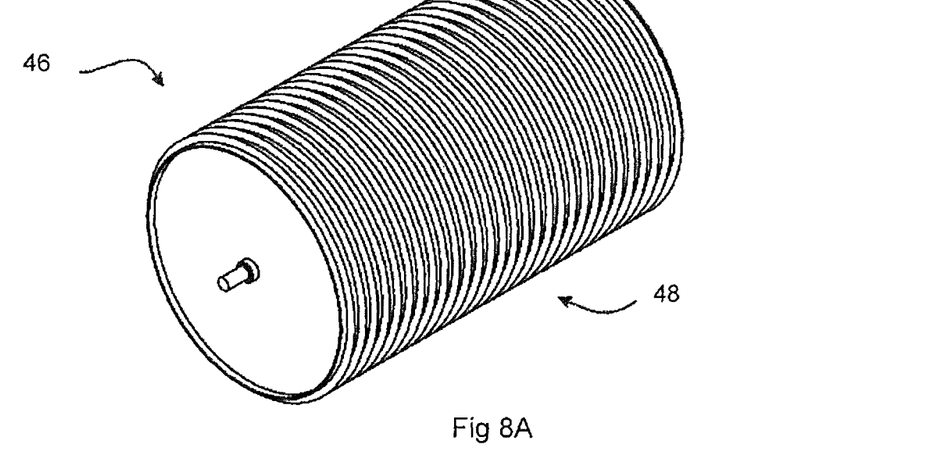
FIGS. 8A and 8B show an arrangement of the drum for crushing the soil and rock ripped up by the ground engaging tools.
Figure 8B:
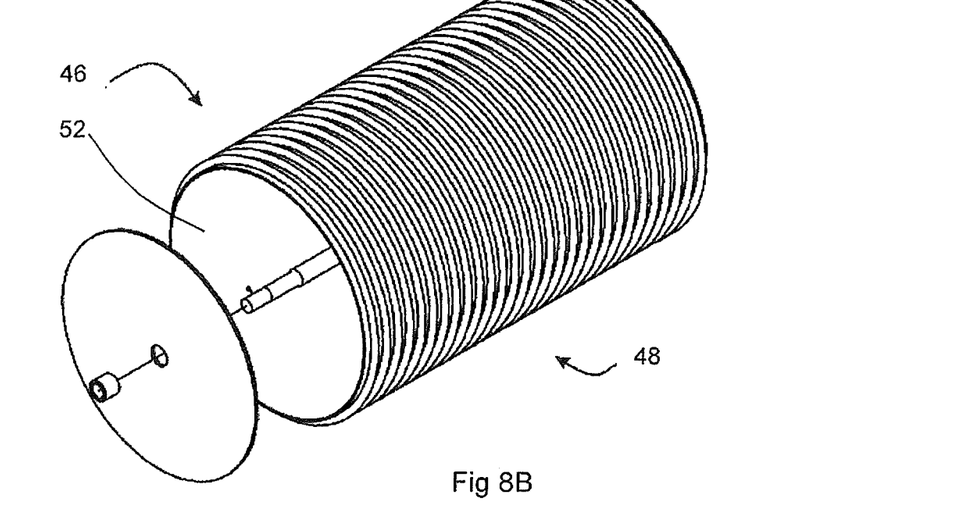
Figure 9A:
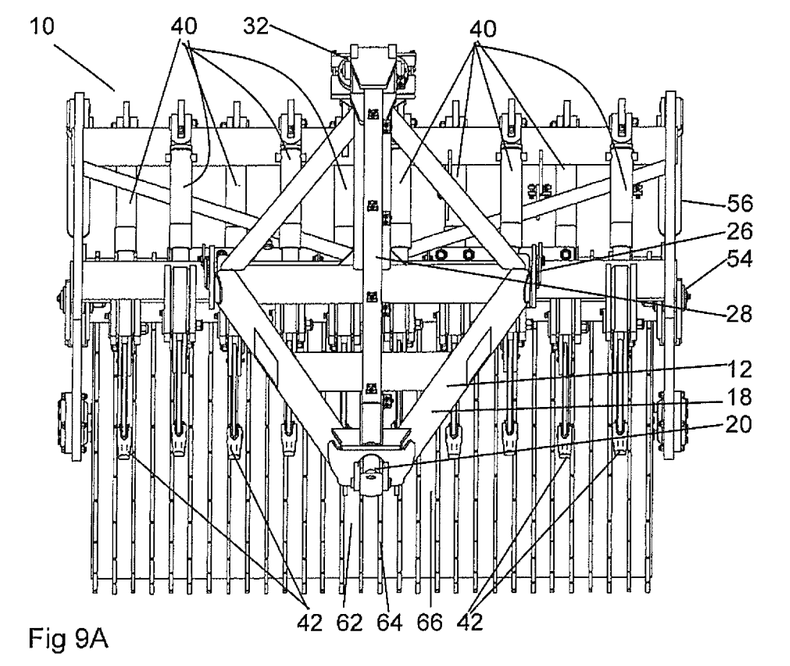
FIGS. 9A and 9B show respective front (FIG. 9A) and rear (FIG. 9B) views of an earth conditioning apparatus according to an embodiment of the present invention.
Figure 9B:
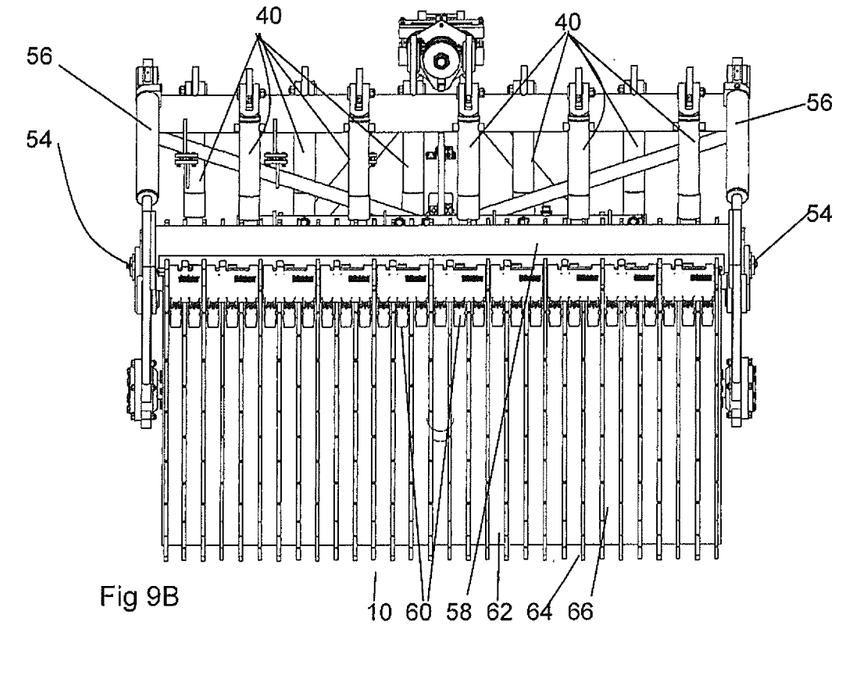

Referring to FIGS. 1 to 9B, there is shown an earth conditioning system 10 according to one or more embodiments of the present invention for us in earth conditioning by engaging into the earth behind a vehicle (not shown) and removing and/or breaking up rock (such as by ripping and/or crushing).

The system 10 includes a front drawbar arrangement 12, an intermediate ground engaging tool arrangement 14 and a rear rotary device 16.

The drawbar arrangement 12 includes a drawbar 18, a hitch 20 at a leading end 22 of the drawbar to attach the system to a prime mover (not shown).

A pivot arrangement 26 is provided at the trailing end 24 of the drawbar.

Support members 28,30 strengthen the drawbar arrangement and provide mounting for a dampener arrangement 32 which absorbs shocks otherwise transferred from the ground engaging tool arrangement and the rotary device to the hitch and thereafter the prime mover.

The dampener arrangement may be connected to the ground engaging tool arrangement at a pivot 32a The dampener can include one or more mechanical dampeners (such as resilient materials and/or springs), a pneumatic or hydraulic accumulator/dampener or a combination of any two or more thereof. The dampener arrangement can be passive or can be actively controlled to react forces applied through the dampener.

The ground engaging tool arrangement 14 includes a frame 34 supporting ground engaging tools 36.

Each ground engaging tool is mounted at a pivot 38 and can pivot rearward and upward. An actuator 40 can be controlled to raise or lower the respective ground engaging tool(s) 36 depending on desired depth that the respective ground engaging tool is required to engage into the ground (which can depend on ground type, proportion of soil to rock, rock type, wet/dry ground, depth required to operate at, power of the prime mover etc.).

Each ground engaging tool 36 can include a replaceable wear part 42. A quick release mechanism can be provided to facilitate removal and replacement of a worn ground wear part.

A leading edge 44 of the ground engaging tool can be strengthened or of a stronger material (such as wear plate material, hardened steel, case hardened steel, bisalloy or alternatives) than a trailing part of the same ground engaging tool.

A rotary device 16 can be attached to trail behind the ground engaging tool arrangement 14.

The rotary device 16 can include a roller or drum 46, such as of a solid (preferably hollow) body with ribs thereon, or can be of spaced discs or wheels or ribs creating channels 48 therebetween.

The rotary device can include a slotted or ribbed said drum 46 to act as a crushing drum for being rolled over earth that has been broken up by the ground engaging tools 36.

The crushing drum function includes a number of reinforcements 50 in the form of crushing ribs 48.

The drum can be hollow to provide a reservoir 52 to receive a ballast material, such as water or sand, to add weight to the drum and thereby increase crushing force over the ground ripped up by the ground engaging tools.

The slotted drum 46 preferably weighs about 5 tonnes (though other weights fall within the scope of the present invention) when empty and more than 10 tonnes when a reservoir is filled with water. The weight of the frame 4.2 excluding the drum preferably weighs between 3 tonnes and 20 tonnes, more preferably between 4 tonnes and 20 tonnes, and yet more preferably between 5 tonnes and 20 tonnes. The weight of the drum 46 is preferably between 3 tonnes and 10 tonnes. It will be appreciated that the frame and/or drum are not limited to these weights and can individually or together be heavier or lighter depending on design, specification and construction factors.

The earth conditioning system 10 provides a multi tonne system for high workload rock crushing for conditioning roads, agricultural and other tracts of land.

The rotary device can be connected to the ground engaging tool arrangement by a pivot arrangement 54 allowing the rotary device and the ground engaging tool arrangement to pivot with respect to one another.

One or more actuators 56, such as one or more hydraulic or pneumatic rams, enables height adjustment of the ground engaging tool arrangement relative to the ground by, for example, extending or contracting the actuator(s). Other actuator, such as electric motors, are envisaged to provide a similar function.

Preferably, the one or more actuators 56 may connect to the ground engaging tool arrangement 14 at a respective pivot 56a.

Therefore, one or more forms of the present invention provides for height adjustment of the ground engaging tools by:
1. Adjusting the height/depth of each ground engaging tool 36 relative to the ground engaging tool support frame 34; and
2. By adjusting the height from the ground of the ground engaging tool arrangement by operating the at least one adjuster acting between the rotary device and the ground engaging tool arrangement.

A scraper device 58 can be provided across the drum 46 to remove any rocks and soil caught between the ribs. The scraper device can include multiple scrapers 60 with each scraper 60 fitting into a slot (or channel) 62 between edges 64 created by the ribs. The edges may be provided by plates being edge on to the body 66 of the rotary drum.

In use, the earth conditioning system can include just the ground engaging tool arrangement mounted to a prime mover, such as a tractor, or may be self propelled. The ground engaging tools can be lowered to engage into the ground as the ground engaging tool arrangement is moved forward. Weight of the ground engaging tool arrangement aids breaking up of rock within the soil.

Alternatively, with the rotary device attached, the depth of the ground engaging tools biting into the ground can be finely adjusted. Also, the drum of the rotary device helps to further break up, level and compact the soil and broken rock.

As would be apparent, various alterations and equivalent forms may be provided without departing from the spirit and scope of the present invention. This includes modifications within the scope of the appended claims along with all modifications, alternative constructions and equivalents.

There is no intention to limit the present invention to the specific embodiments shown in the drawings. The present invention is to be construed beneficially to the applicant and the invention given its full scope.

In the present specification, the presence of particular features does not preclude the existence of further features. The words 'comprising', 'including' and 'having' are to be construed in an inclusive rather than an exclusive sense.

It is to be recognised that any discussion in the present specification is intended to explain the context of the present invention. It is not to be taken as an admission that the material discussed formed part of the prior art base or relevant general knowledge in any particular country or region.

The invention claimed is:

1. An earth conditioning system, including a ground engaging tool arrangement, the arrangement comprising:
   a ground engaging tool having a body formed of a first material and being configured to be for being urged below a ground surface, the ground engaging tool defining:
      a leading edge having a curved profile, the leading edge comprising a second material, wherein the second material is treated to be stronger or harder than the first material of the body;
      a replaceable wear part removably mounted to the body;
   a ground engaging tool support structure supporting the ground engaging tool; and
   an actuator operably connecting the ground engaging tool to the earth conditioning system, the actuator pivotally mounted to the body of the ground engaging tool;
   wherein the ground engaging tool is configured to move between:
      a deployed configuration in which the replaceable wear part is driven downwards and forwards into earth below the ground surface; and
      a retracted configuration in which the replaceable wear part is pivoted upwards and rearwards towards the ground surface,
   wherein the ground engaging tool is mounted to the ground engaging tool support structure at a pivot located at a proximal end of the ground engaging tool, such that in the deployed configuration the curved profile of the leading edge is configured to contact rock below the ground surface holding the rock down to cut therethrough.

2. The system of claim 1, wherein the ground engaging tool arrangement is combined with a rotary device.

3. The system of claim 2, wherein the rotary device includes a drum or roller arranged to follow the ground engaging tool arrangement.

4. The system of claim 2, the rotary device including a hollow drum with external ribs or a series of wall structures defining a number of edges with channels therebetween.

5. The system of claim 1, wherein the ground engaging tool arrangement includes a ground engaging tool adjustment system to adjust a height of the engaging tool relative to the ground surface.

6. The system of claim 5, wherein the height adjustment of the ground engaging tool is provided by at least one height adjustment actuator.

7. The system of claim 6, wherein the at least one height adjustment actuator includes one or more of a hydraulic ram, a pneumatic ram, an electric actuator, a mechanical actuator, or a combination of any two or more thereof.

8. The system of claim 5, wherein the ground engaging tool arrangement is pivotably connected to a rotary device, and a height of the ground engaging tool support structure relative to the ground surface is adjusted by at the least one height adjustment actuator acting between the rotary device and the ground engaging tool arrangement.

9. The system of claim 8, wherein the pivot allows the ground engaging tool arrangement to pivot relative to the rotary device during use over uneven ground and to allow the replaceable wear part to rotate towards the ground surface relative to the rotary device.

10. The system of claim 1, wherein a drawbar connection between a prime mover and the earth conditioning system comprises at least one of a horizontal shock dampener and a vertical shock dampener.

11. The system of claim 1, wherein the ground engaging tool arrangement is mounted between a rotary device and a hitch portion, the ground engaging tool is pivotally connected to the rotary device via a height adjustment actuator and the hitch portion facilitates engagement with a prime mover, wherein the ground engaging tool is positionable relative to the ground surface by adjusting the height adjustment actuator.

12. The system of claim 1, wherein the ground engaging tool is configured to be moved from the deployed configuration to the retracted configuration when the ground engaging tool strikes a very hard rock, a large rock or debris by overcoming the actuator.

13. The system of claim 1, wherein mechanical relief of the ground engaging tool is provided by at least one of: a shear pin; a biasing mechanism; a spring; a dampener; and an accumulator.

14. The system of claim 1, wherein:
   the ground engaging tool support structure supports a plurality of ground engaging tools, wherein each ground engaging tool is operatively connected to the earth conditioning system by a respective actuator, and wherein each respective actuator is pivotally mounted to the body of a respective ground engaging tool; and
   wherein each ground engaging tool is configured to pivot independently between the deployed configuration and the retracted configuration.

15. The system of claim 1, wherein the ground engaging tool is released towards the retracted configuration upon sensing shock and/or pressure on the ground engaging tool from contact with rock or debris, the ground engaging tool rotating about the pivot to compress the actuator as the replaceable wear part is lifted upwards and rearwards towards the ground surface, such that the curved profile of the leading edge remains in contact with the rock or debris.

16. The system of claim 1, wherein the curved profile of the leading edge has an s-shape.

17. The system of claim 1, wherein the ground engaging tool arrangement is configured to be towed behind a prime mover.

18. The system of claim 17, further comprising a rotary device that trails behind the ground engaging tool arrangement, wherein the rotary device provides a secondary rock crushing application, to crush rock cut by the ground engaging tool arrangement.

19. A method of use of an earth conditioning system providing:
 a ground engaging tool arrangement, the arrangement comprising:
  a ground engaging tool having a body formed of a first material and being configured to be urged below a ground surface, the ground engaging tool defining:
  a leading edge having a curved profile, the leading edge comprising a second material, wherein the second material is treated to be stronger or harder than the first material of the body;
  a replaceable wear part removably mounted to the body;
  a ground engaging tool support structure supporting the ground engaging tool; and
  an actuator operably connecting the ground engaging tool to the earth conditioning system, the actuator pivotally mounted to the body of the ground engaging tool;
  wherein the ground engaging tool is configured to move between:
   a deployed configuration in which the replaceable wear part is driven downwards and forwards into earth below the ground surface; and
   a retracted configuration in which the replaceable wear part is pivoted upwards and rearwards towards the ground surface,
  wherein the ground engaging tool is mounted to the ground engaging tool support structure at a pivot located at a proximal end of the ground engaging tool, such that in the deployed configuration the curved profile of the leading edge is configured to contact rock below the ground surface holding the rock down to cut therethrough.

20. The method of claim 19, including providing the ground engaging tool arrangement in combination with a rotary device.

21. The method of claim 20, the rotary device provided as a roller or drum acting behind the ground engaging tool arrangement to condition the earth after the at least one ground engaging tool has broken rocks in the earth and brought the broken rocks to the ground surface.

22. The method of claim 19, wherein the ground engaging tool arrangement pivots relative to a rotary device.

23. The method of claim 19, including propelling the ground engaging tool arrangement across an area of ground, adjusting a height of the ground engaging tool relative to the ground surface by adjusting at least one of: (i) a position of the ground engaging tool relative to the ground engaging tool support structure via actuation of the actuator; and (ii) varying a height of the ground engaging tool arrangement relative to a rotary device via adjustment of a height adjustment actuator.

24. The method of claim 19, wherein mechanical relief of the ground engaging tool is provided by at least one of: a shear pin; a biasing member; a spring; a dampener; and an accumulator.

25. The method of claim 19, including adjusting a height of the ground engaging tool relative to the ground surface by at least one height adjustment actuator.

26. The method of claim 19, wherein the actuator is selected from: a hydraulic actuator; a pneumatic actuator; an electric actuator; and a mechanical actuator.

27. The method of claim 19, further comprising the step of:
 configuring the ground engaging tool to pivot from the deployed configuration to the retracted configuration when the ground engaging tool strikes a very hard rock, a large rock or debris below the ground surface.

28. The method of claim 27, wherein the pivoting of the ground engaging tool is damped by a dampener or a shock absorber.

* * * * *